(12) United States Patent
Kawase

(10) Patent No.: US 6,915,357 B2
(45) Date of Patent: Jul. 5, 2005

(54) CONTROL APPARATUS AND CONTROL METHOD

(75) Inventor: Yuji Kawase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 10/411,966

(22) Filed: Apr. 11, 2003

(65) Prior Publication Data

US 2003/0233496 A1 Dec. 18, 2003

(30) Foreign Application Priority Data

Apr. 12, 2002 (JP) ........................................ 2002-111284

(51) Int. Cl.$^7$ ............................................. G06F 13/28
(52) U.S. Cl. ........................................ 710/25; 710/28
(58) Field of Search ............................. 710/25, 22, 28, 710/308; 318/696, 561

(56) References Cited

U.S. PATENT DOCUMENTS

| | | | |
|---|---|---|---|
| 4,933,616 A | | 6/1990 | Chang et al. ............... 318/561 |
| 5,583,410 A | * | 12/1996 | Jacobson et al. .......... 318/696 |
| 6,014,000 A | | 1/2000 | Gutierrez .................... 318/696 |
| 6,209,042 B1 | * | 3/2001 | Yanagisawa et al. .......... 710/3 |
| 6,557,052 B1 | * | 4/2003 | Kubo .......................... 710/23 |
| 2001/0049754 A1 | * | 12/2001 | Kawase ....................... 710/22 |
| 2002/0138697 A1 | * | 9/2002 | Kanda ......................... 711/114 |
| 2004/0093439 A1 | * | 5/2004 | Miura et al. ................. 710/22 |
| 2004/0223733 A1 | * | 11/2004 | Kojima ........................ 386/46 |
| 2004/0225759 A1 | * | 11/2004 | Kohashi ....................... 710/22 |

FOREIGN PATENT DOCUMENTS

| | | |
|---|---|---|
| EP | 1 154 341 | 11/2001 |
| JP | 05-130162 | 5/1993 |
| JP | 05-292142 | 11/1993 |
| JP | 06-095815 | 4/1994 |
| JP | 09-265367 | 10/1997 |
| JP | 11-085669 | 3/1999 |
| JP | 2000-089920 | 3/2000 |
| JP | 2001-327191 | 11/2001 |

* cited by examiner

Primary Examiner—Jeffrey Gaffin
Assistant Examiner—Harold Kim
(74) Attorney, Agent, or Firm—Michael T. Gabrik

(57) ABSTRACT

Complex control procedures employ direct memory access by a first DMA processing unit 54 to send control data to a first controller by means of DMA channels $54_{-1}$ to $54_{-n}$, and by a second DMA processing unit 56 to send control data to a second controller 36 by means of DMA channels $56_{-1}$ to $56_{-m}$. The first DMA processing unit 54 also has a branching controller 52 as a DMA channel for transferring timing data to a second timer 40. When a time specified by the received timing data passes, the second timer 40 sends an activation signal to DMA channel $56_{-1}$ of the second DMA processing unit 56, and the DMA channels $56_{-1}$ to $56_{-m}$ are thereafter sequentially activated.

22 Claims, 12 Drawing Sheets

| 1 | 2 | 3 | 4 | 5 | 6 | 7 | 8 | 9 | 10 | 11 | 12 | 13 | |
|---|---|---|---|---|---|---|---|---|---|---|---|---|---|
| 00 | x1 | 00 | x2 | 00 | x3 | 01 | d1 | 01 | d2 | 01 | d3 | 01 | ... |

CONTROL APPARATUS AND CONTROL METHOD

BACKGROUND OF THE INVENTION

1. Field of the Invention

The present invention relates to a control apparatus and control method using direct memory access.

2. Description of the Related Art

Drive mechanisms used in the latest electronic devices require extremely fast, accurate operation. One control method known to be able to satisfy these requirements uses direct memory access (DMA). DMA enables data to be sent by a dedicated hardware circuit directly from memory to the drive mechanism controller instead of passing first through the CPU. Because DMA allows the drive mechanism to be controlled without calling the CPU, DMA is also compatible with high speed operation of the drive mechanism.

Japanese Patent Laid-Open Publication (kokai) 2001-327191 teaches a control apparatus that applies DMA to control a printer drive mechanism. This control apparatus has a timing data table that stores timing data defining the timing at which control changes, and a control data table that stores control data used each time control changes. After a CPU drive start request is asserted, a first DMA channel sends timing data from the timing data table to the timer, and each time the timer times out an activate signal is sent to a second DMA channel. Each time this second DMA channel receives an activate signal, it sequentially supplies control data stored in the control data table to the drive mechanism control unit. Once the CPU issues the drive start request, this configuration thus enables controlling the drive mechanism according to predefined timing data and control data without involving the CPU.

Furthermore, the second DMA channel has a plurality of DMA channels, each corresponding to a respective one of a plurality control data types. When DMA transfer of the first control data is completed by activation of the first DMA channel, the next DMA channel is activated to pass the second control data, and so forth. DMA control can thus be used to operate a drive mechanism based on plural control data types.

More specifically, the above-cited control apparatus is configured to link operation of plural DMA channels in a control chain, thereby enabling controlling a drive mechanism using plural types of control data without involving the CPU.

As described above, when an activate signal is applied to the second DMA channel in the conventional control apparatus described above, the plural DMA channels in the second DMA channels are automatically activated in sequence. This makes it difficult to achieve complicated control processes, such as supplying control data with different timing to plural controlled objects, because the activation timing of these plural DMA channels cannot be separately controlled.

OBJECT OF THE INVENTION

The present invention is directed to solving the above problem. Accordingly, an object of this invention is to provide a control apparatus and control method enabling more complex control applications using direct memory access.

SUMMARY OF THE INVENTION

According to one aspect of the present invention, a control apparatus is provided that is configured to send control data appropriate for a specific one of a plurality of controllers each running a process based on at least one type of control data. The control apparatus comprises a first DMA processing unit configured to be activated each time a first activation signal is received, read from memory control data of a type compatible with a first controller, and transfer that read control data to the first controller; and a second DMA processing unit configured to be activated each time a second activation signal is received, read from memory control data of a type compatible with a second controller, and transfer that read control data to the second controller. In accordance with this aspect of the invention, the first DMA processing unit comprises a DMA activation component configured to execute a process of sending the second activation signal to the second DMA processing unit.

The first DMA processing unit, which transfers control data to the first controller, can therefore also start the second DMA processing unit to transfer control data to the second controller. Control data can thus be synchronously transferred to the first and second controllers.

This control apparatus preferably also includes first and second control data tables from which control data is read by the first and second DMA processing units, and a control data setting component for writing control data to the first and second control data tables. Thus comprised, control data preset in the first and second control data tables can be transferred respectively to the first and second controllers, which can be then operated according to the preset control data.

Further preferably, the control apparatus also includes a first timer for outputting a specific time-up signal when a time specified by received timing data elapses, and a first timer controller that is activated each time a drive or reactivation signal is received, to read from memory timing data specifying a change-operation timing for the first controller and to send the read timing data to the first timer. The time-up signal output by the first timer is sent to the first DMA processing unit as the first activation signal, and the first DMA processing unit reactivates the first timer controller when it completes the data transfer operation.

Sending the first activation signal to the first DMA processing unit when the time indicated by the read timing data elapses, after the activation signal is sent to the first timer controller, causes the first timer controller to start. The first timer controller is again reactivated when the first DMA processing unit completes its transfer of data to the first controller.

Yet further preferably, the control apparatus also has a timing data table from which the first timer controller reads timing data, and a timing data setting component for setting timing data in the timing data table. Thus comprised the transfer timing for sending the control data to the first DMA processing unit can be controlled based on the timing data preset in the timing data table.

Yet further preferably, a control apparatus according to the present invention has a second timer for outputting a second time-up signal when a time specified by timing data received by the second timer elapses. Moreover, the DMA activation component reads timing data from memory and sends the read timing data to the second timer each time the first activation signal is received. The second time-up signal output by the second timer is sent as the second activation signal to the second DMA processing unit. It is therefore possible to set the activation timing of the second DMA processing unit based on the timing data sent by the DMA activation component.

Yet further preferably, the first DMA processing unit a DMA for each type of control data to be used and compatible with the first controller, wherein each such DMA reads from memory and transfers to the first controller the corresponding type of compatible control data one data unit at a time.

Yet further preferably, the second DMA processing unit comprises a DMA channel for each type of control data to be used and compatible with the second controller, wherein each such DMA channel reads from memory and transfers to the second controller the corresponding type of compatible control data one data unit at a time. Moreover, the first DMA processing unit has a DMA-operation-controller for reading from memory and transferring to a control register of at least one DMA channel operation control data specifying the data transfer operation of each such DMA channel. When there are plural types of control data used by the second control unit, it is therefore possible to send data of each type separately to the second control unit. In addition, the data transfer operation of at least one DMA channel in the second DMA processing unit can be specified by the DMA-operation-controlling DMA channel of the first DMA processing unit. In other words, the first DMA processing unit can change the operation of the second DMA processing unit.

Yet further preferably, one DMA of the first DMA processing unit is activated first and the others are sequentially activated.

Yet further preferably, the operation control data specifies any of the following: data transfer source, data transfer destination, data transfer count, or linked DMA channel indicating a DMA channel to be activated next.

Yet further preferably, the second DMA processing unit comprises a first DMA channel and a plurality of second DMA channels that can be activated by the first DMA channel. The DMA-operation-controller of the first DMA processing unit transfers to the control register of the first DMA channel data specifying as the linked DMA channel any one of the plural second DMA channels. The first DMA processing unit can therefore specify which DMA channel is activated by the second DMA processing unit.

Yet further preferably, the first controller is configured to control a stepping motor that drives a printer carriage of a printer; the second controller is configured to control a print head disposed on the printer carriage; the timing data sent to the first timer by the first timer controller specifies the phase change timing of the stepping motor; the control data transferred to the first controller by the first DMA processing unit includes phase pattern data for specifying the phase pattern of voltage to be applied to the stepping motor at each phase change timing, and current data for specifying the current to be supplied to the stepping motor at each phase change timing; and the control data transferred to the second controller by the second DMA processing unit includes print data to be printed by the print head at the phase change timing. It is therefore possible to control the print head synchronized to drive control of the printer carriage.

Preferably in this case the printer is an ink-jet printer, and the print data specifies each pixel to be printed by the print head, the ink being discharged in each of multiple divisions or sub-periods of the ink discharge period of the print head. The second DMA processing unit has a DMA channel activated each time the second activation signal is received to read print data from memory and to transfer the read print data to the second controller, and an activation component for sending the second activation signal to the DMA channel of the second DMA processing unit at a timing corresponding to each of the multiple divisions. This enables controlling the pixel density based on the ink discharge time synchronized to the drive control of the printer carriage.

Yet further preferably, the first controller is configured to control a stepping motor that drives an ink-jet printer carriage, the ink-jet printer having an ink data output configured to output an ink detection signal indicative of ink presence; the second controller comprises a processing unit configured to execute a specific process based on ink detection data obtained from the ink detection signal; the timing data sent to the first timer by the first timer controller specifies the phase change timing of the stepping motor; the control data transferred by the first DMA processing unit to the first controller contains phase pattern data for specifying the phase pattern of voltage to be applied to the stepping motor at each phase change timing, and current data for specifying the current to be supplied to the stepping motor at each phase change timing; the second DMA processing unit comprises an ink-data-transfer DMA configured to read from memory and transfer to the second controller ink detection data obtained from the ink detection signal; and the DMA-operation-controller of the first DMA processing unit is configured to read from memory transfer count data as the operation control data, and transfer that read transfer count data to a control register of the ink-data-transfer DMA, the transfer count data having a value of 0 or a specified positive value.

The data transfer count of the ink-data-transfer DMA channel of the second DMA processing unit can therefore be set to 0 or a positive value by the first DMA processing unit. The ink-data-transfer DMA channel can therefore send to the second controller only the data from the period required to determine if there is any ink present from the ink detection data obtained from the ink detection signal.

Yet further preferably, the first controller includes a receive buffer configured to store data received by a printer; the second controller includes a plurality of type-specific buffers, each configured to store received data of the specified data type; the plurality of second DMAs of the second DMA processing unit are disposed according to their respective types, and transfer data stored in the receive buffer to the type-specific buffers according to the data type. Also, the first DMA processing unit comprises a received-data-transfer DMA configured to read from memory and transfer to the receive buffer data received by the printer, a table transfer DMA configured to read from the receive buffer and transfer to memory DMA identification data indicating which second DMA corresponds to a particular received data type when data denoting the received data type is received by the table transfer DMA, and a DMA configured to read the DMA identification data output from memory and transfer it to a control register of the first DMA as operation control data specifying the linked DMA channel.

A second DMA channel corresponding to a specific data type can thus be activated according to the type of received data stored in the receive buffer. Each second DMA channel stores received data of a compatible type in the corresponding type-specific buffer. Received data can therefore be transferred to a type-specific buffer according to the received data type.

A control method for sending control data appropriate for a specific one of a plurality of controllers each running a process based on at least one type of control data is also provided. Such method comprises activating a first DMA processing routine each time a first activation signal is asserted, the first DMA processing routine including reading from memory control data of a type compatible with a first controller, and transferring that read control data to the first controller; and activating a second DMA processing routine each time a second activation signal is asserted, the second DMA processing routine including reading from memory control data of a type compatible with a second controller, and transferring that read control data to the second controller; wherein the first DMA processing routine comprises a DMA activation step for executing a process of sending the second activation signal to the second DMA processing unit.

Preferably, such method further comprises reading from memory timing data specifying a change-operation timing for the first controller; and asserting the first activation signal when a time specified by the timing data elapses, each time a drive signal or reactivation signal is issued.

Preferably, each time the first activation signal is asserted the DMA activation step includes reading timing data from memory and asserting the second activation signal when a time specified by that read timing data elapses.

In another aspect of the invention, a control method for sending to each of multiple control units control data appropriate for the respective control unit is provided. Each control unit is adapted to run a process based on at least one type of control data. The control method comprising the steps of (a) detecting first activation signals; (b) upon each detected first activation signal, reading control data of a type suitable for a first control unit from memory and transferring the control data to the first control unit; (c) detecting second activation signals; and (d) upon each detected second activation signal, reading control data of a type suitable for a second control unit from memory and transferring the control data to the second control unit; wherein step (b) includes a step of issuing the second activation signal.

Preferably, such method further comprises the steps of (e) detecting timing activation signals; and (f) upon each detected timing activation signal, reading from memory timing data specifying a change-operation timing for the first control unit, and issuing the first activation signal when a time specified by the timing data passes.

Preferably, step (b) comprises, upon each first activation signal, reading timing data from memory and issuing the second activation signal when a time specified by the timing data passes.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
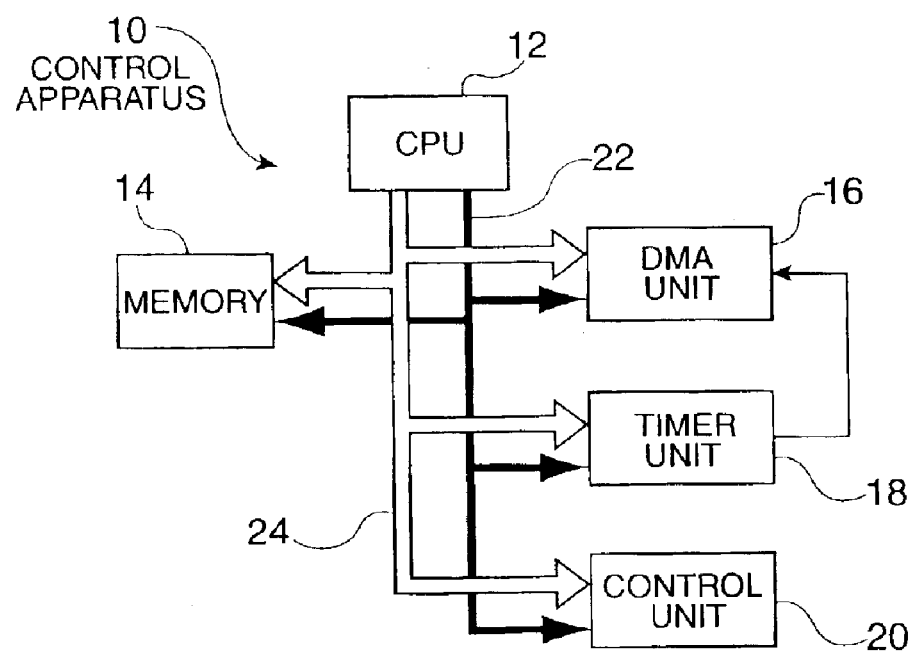
FIG. 1 is a schematic block diagram of a control apparatus according to the present invention.

FIG. 1 is a schematic block diagram of a control apparatus 10 in which the present invention is applied. As shown in the figure this control apparatus 10 has a CPU 12 that runs operating and control processes according to a program stored in memory 14. A DMA unit 16 handles DMA transfers of data between the memory 14 and various input/output (I/O) devices (e.g., a timer unit 18 and control unit 20) without going through the CPU 12.

The data read address from memory 14 and the destination address for the read data are specified by the address bus 22, and the read data is transferred via a data bus 24. When timing data is sent from the memory 14 to the timer unit 18, the timer unit 18 begins measuring time and outputs a time-up signal to the DMA unit 16 when the time denoted by the received timing data passes. The DMA unit 16 thus sends specific control data from the memory 14 to the control unit 20.

Preferred embodiments of the present invention are described next below with reference to the accompanying figures. Parts having the same function in each of the following embodiments are identified using the same reference numerals, and further description thereof is omitted or abbreviated, as appropriate, in later-described embodiments.

First Embodiment

Figure 2:
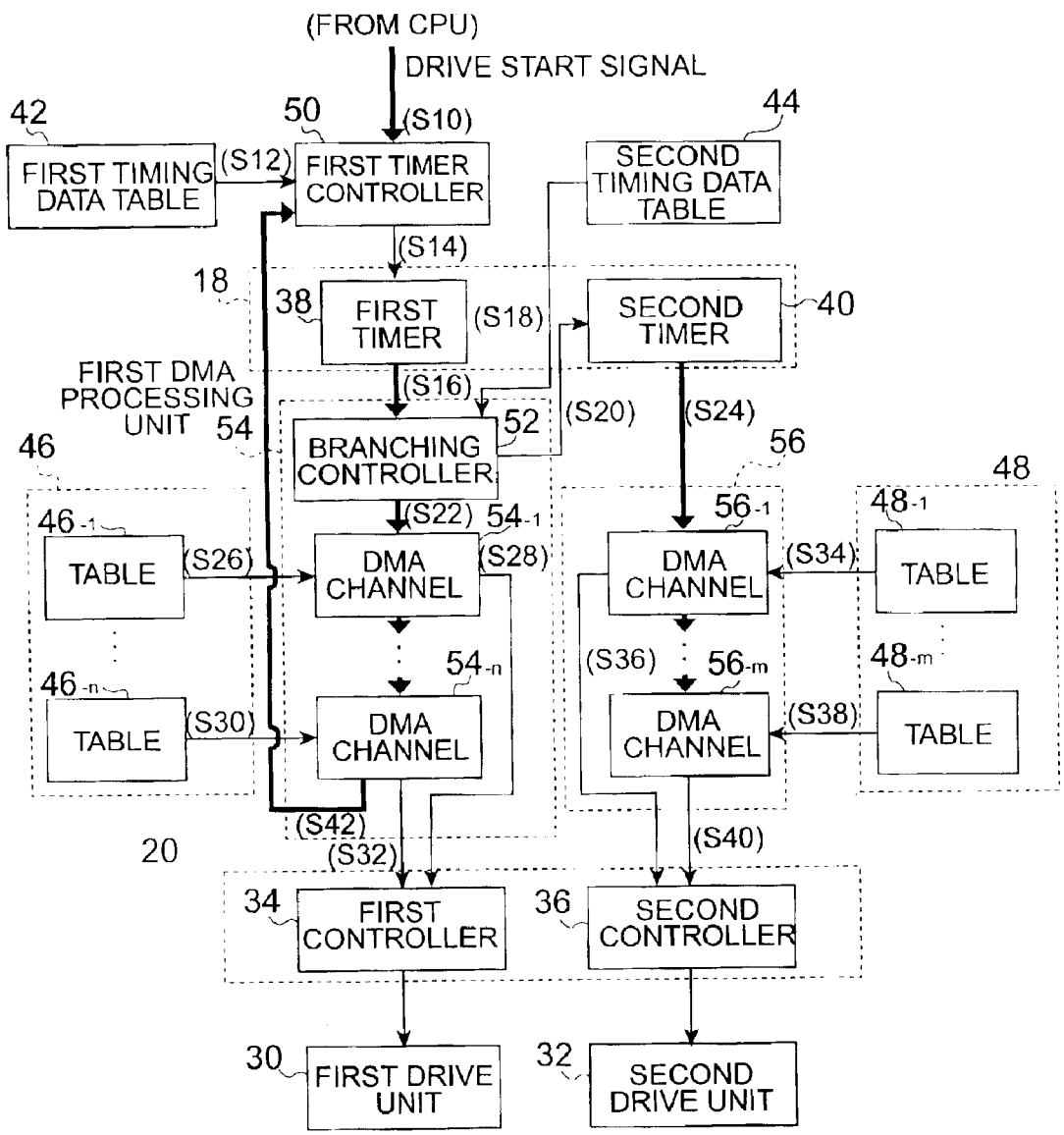
FIG. 2 is a functional block diagram showing the configuration and operating flow of a control apparatus according to a first embodiment of the invention.

FIG. 2 is a functional block diagram showing the configuration of a first embodiment of the invention together with a flow diagram of its operation. It should be noted that, in FIG. 2 and in each of the following figures showing similar functional block diagrams, the DMA activation operation is indicated by bold lines and the data transfer flow is indicated by fine lines.

As shown in FIG. 2, the control unit 20 of this embodiment is composed of a first controller 34 and a second controller 36, which respectively control a first drive unit 30 and a second drive unit 32. In this embodiment, the first drive unit 30 is a drive mechanism for driving a printer carriage, and the second drive unit 32 is the print head of the printer, but the drive units are not limited to such components. Rather, the drive units 30 and 32 may be an suitable controlled component.

The timer unit 18 is composed of a first timer 38 corresponding to the first controller 34, and a second timer 40 corresponding to the second controller 36. The first timer 38 and second timer 40 each have specific registers to which timing data can be written. The timers output a time-up signal when the time specified by the timing data elapses.

The control apparatus 10 of this embodiment also has a first timing data table 42, second timing data table 44, first control data table 46, and second control data table 48.

Timing data for controlling the timing at which operation of the first controller 34 and second controller 36 changes is stored to first timing data table 42 and second timing data table 44. More specifically, in this embodiment, this timing data denotes the time interval between the control change.

The first control data table 46 has "n" tables $46_{-1}$ to $46_{-n}$, each for storing a respective one of "n" types of control data, for controlling operation of the first controller 34 at the respective control change times.

The second control data table 48 likewise has "m" tables $48_{-1}$ to $48_{-m}$, each of which stores a respective one of "m" types of control data, for controlling operation of the second controller 36 at the respective control change times.

Each of these tables 42, 44, $46_{-1}$ to $46_{-n}$, and $48_{-1}$ to $48_{-m}$ are provided at a specific allocated address space in memory 14, and the data stored in each table is set by the CPU 12 before control starts.

The control apparatus 10 of this embodiment also has a first timer controller 50, first DMA processing unit 54, and second DMA processing unit 56. The first DMA processing unit 54 has a branching controller 52 and "n" DMA channels $54_{-1}$ to $54_{-n}$ corresponding to the n-types of control data for the first controller 34. The second DMA processing unit 56 has "m" DMA channels $56_{-1}$ to $56_{-m}$ corresponding to the m-types of control data for the second controller 36.

The first timer controller 50, branching controller 52, DMA channels $54_{-1}$ to $54_{-n}$, and DMA channels $56_{-1}$ to $56_{-m}$ constitute the DMA unit 16 shown in FIG. 1 and function as independent DMA channels.

Figure 3:
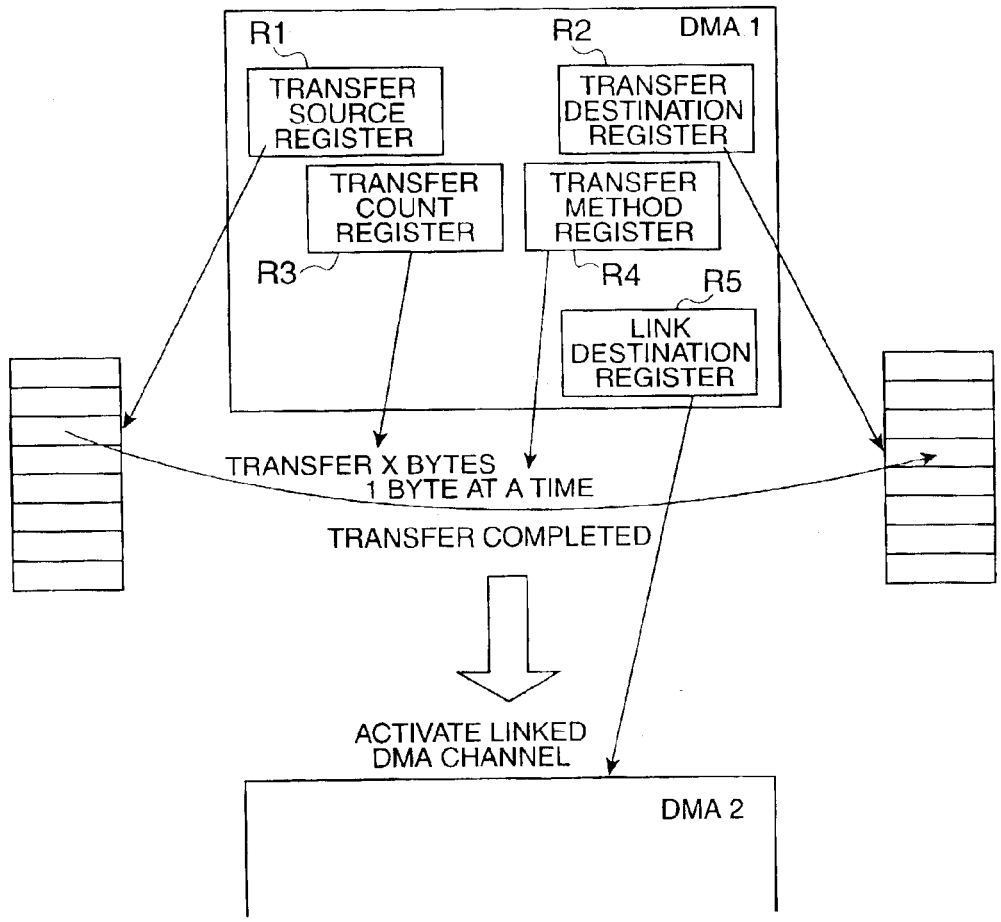
FIG. 3 shows the configuration of a DMA channel and the basic DMA operation.

FIG. 3 shows the configuration and basic operation of DMA. Each DMA channel has a transfer source register R1, transfer destination register R2, transfer count register R3, transfer method register R4, and link destination register R5. The transfer source register R1 and transfer destination register R2 respectively store the source address and the destination address of the DMA transfer. The transfer count register R3 is for storing the data transfer count for one activation (i.e., the number of data blocks transferred each time the channel is activated). The transfer method register R4 stores the method used for the data transfer, such as whether data is transferred one byte at a time or by block unit. The link destination register R5 is for declaring the DMA channel to be activated when a DMA transfer process ends. That is, when DMA starts, the number of data bytes specified in transfer count register R3 is transferred by the method specified in transfer method register R4 from the source address stored in transfer source register R1 to the destination address stored in transfer destination register R2. When the data transfer is completed, the DMA channel registered in link destination register R5 (the "linked DMA channel" below) is activated.

When data is transferred by DMA, the address values set in transfer source register R1 and transfer destination register R2 are automatically incremented to point to the next memory address. Furthermore, the DMA registers R1 to R5 and the registers used by first timer 38 and second timer 40 are reserved at specific addresses in memory 14, and data is written to the registers by transferring data to the corresponding memory address.

The operation of this embodiment is described next with reference to FIG. 2. First, when a drive start signal is sent from the CPU 12 to the first timer controller 50 (S10), that controller reads timing data from the first timing data table 42 (S12) and passes that timing data to a register of the first timer 38 (S14). When the time specified by the timing data elapses, the first timer 38 sends a time-up signal to the branching controller 52 of the first DMA processing unit 54 (S16).

The branching controller 52 is activated by the time-up signal, and then reads timing data from the second timing data table 44 (S18) and transfers that timing data to a register of the second timer 40 (S20). When this data transfer is completed, the branching controller 52 activates the linked DMA channel, that is, DMA channel $54_{-1}$ (S22). When the time specified by the timing data elapses, the second timer 40 outputs a time-up signal to DMA channel $56_{-1}$ of the second DMA processing unit 56 (S24). As a result, DMA channel $56_{-1}$ is activated.

As thus described, a start driving signal originating from the CPU 12 initiates a process whereby DMA channel $54_{-1}$ of first DMA processing unit 54 is activated following a transfer of timing data to the second timer 40 by the branching controller 52, and thereafter, when the time specified by that transferred timing data elapses, DMA channel $56_{-1}$ of second DMA processing unit 56 is activated. First DMA processing unit 54 and second DMA processing unit 56 thereafter handle DMA transfers by means of DMA channels $54_{-1}$ to $54_{-n}$ and DMA channels $56_{-1}$ to $56_{-m}$.

More specifically, DMA channel $54_{-1}$, upon being activated by the branching controller 52, reads the first control data from table $46_{-1}$ in the first control data table 46 (S26) and transfers the read control data to the first controller 34 (S28). When this data transfer is completed DMA channel $54_{-2}$, which is the linked DMA channel of DMA channel $54_{-1}$, is activated, and then reads control data from table $46_{-2}$ and transfers the read control data to the first controller 34. This process repeats until each DMA channel $54_{-i}$ (where i≦n) is sequentially activated, reads control data from the corresponding table $46_{-i}$ (S30) and transfers the read control data to the first controller 34 (S32), thus transferring n-different control data to the first controller 34.

Likewise in the second DMA processing unit 56, DMA channel $56_{-1}$, upon being activated by the second timer 40, reads control data from table $48_{-1}$ in the second control data table 48 (S34) and transfers the read control data to the second controller 36 (S36). When this data transfer is completed DMA channel $56_{-2}$, which is the linked DMA channel of DMA channel $56_{-1}$, is activated, and then reads control data from table $48_{-2}$ and transfers the read control data to the second controller 36. This process repeats until each DMA channel $56_{-i}$ (where i≦m) is sequentially, activated, reads control data from the corresponding table $48_{-i}$ (S38) and transfers the read control data to the second controller 36 (S40).

The first timer controller 50 is the linked DMA channel of DMA channel $54_{-n}$ in the first DMA processing unit 54, and when data transfer from DMA channel $54_{-n}$ ends, the first timer controller 50 is restarted (S42). Therefore, steps described above repeat, starting with the timing data being read from the first timing data table 42 by the first timer controller 50 and then transferred to the first timer 38. Because the address of the transfer source register of each DMA channel has been incremented at this time, control data of each type stored to each table is sequentially read and passed along. When there is no more timing data to be read from the first timing data table 42, the first timer controller 50 stops operating and the data transfer sequence ends.

At the control timing specified by the timing data stored in the first timing data table 42, the first DMA processing unit 54 thus transfers the n-different control data stored in the n tables $46_{-1}$ to $46_{-n}$ of the first control data table 46 one at a time by type to the first controller 34, and the first controller 34 then controls the first drive unit 30 according to this received control data.

Furthermore, after a delay specified by the timing data stored in the second timing data table 44, the m-different control data stored in the m tables $48_{-1}$ to $48_{-m}$ in the second control data table 48 are transferred one at a time by type by the second DMA processing unit 56 to the second controller 36, and the second controller 36 then controls the second drive unit 32 according to this received control data.

It will thus be apparent that as a result of pre-storing timing and control data in accordance with control operations to be performed by the first and second controllers 34 and 36, this embodiment of the present invention can, without imposing a load on the CPU 12, precisely control the operation of the first and second drive units 30 and 32 to run separate, but mutually synchronized processes.

It should be noted that in this illustrated embodiment control data is DMA transferred to two controllers 34 and 36 as a result of the branching controller 52 of the first DMA processing unit 54 activating a second DMA processing unit 56. The present invention shall not be so limited; rather, the teachings described herein can be extended such that control data can be transferred to three or more control units within the range of usable DMA channels by, for example, disposing a DMA device identical to the branching controller 52 in the second DMA processing unit 56 so that this DMA device activates yet another DMA processing unit.

Furthermore, in the above-described embodiment the first timer controller 50 is designated as the linked DMA channel of the last DMA channel $54_{-n}$ in the first DMA processing unit 54, and when data transfer by the last DMA channel $54_{-n}$ ends the next DMA processing cycle starts from the first timer controller 50. The invention shall not be so limited, however. For example, by setting the first timer controller 50 as the linked DMA channel of the last DMA channel $56_{-m}$ in the second DMA processing unit 56, the process cycle starting time of the first DMA processing unit 54 can be set referenced to the end time of data transfers by the second DMA processing unit 56.

Second Embodiment

Figure 4:
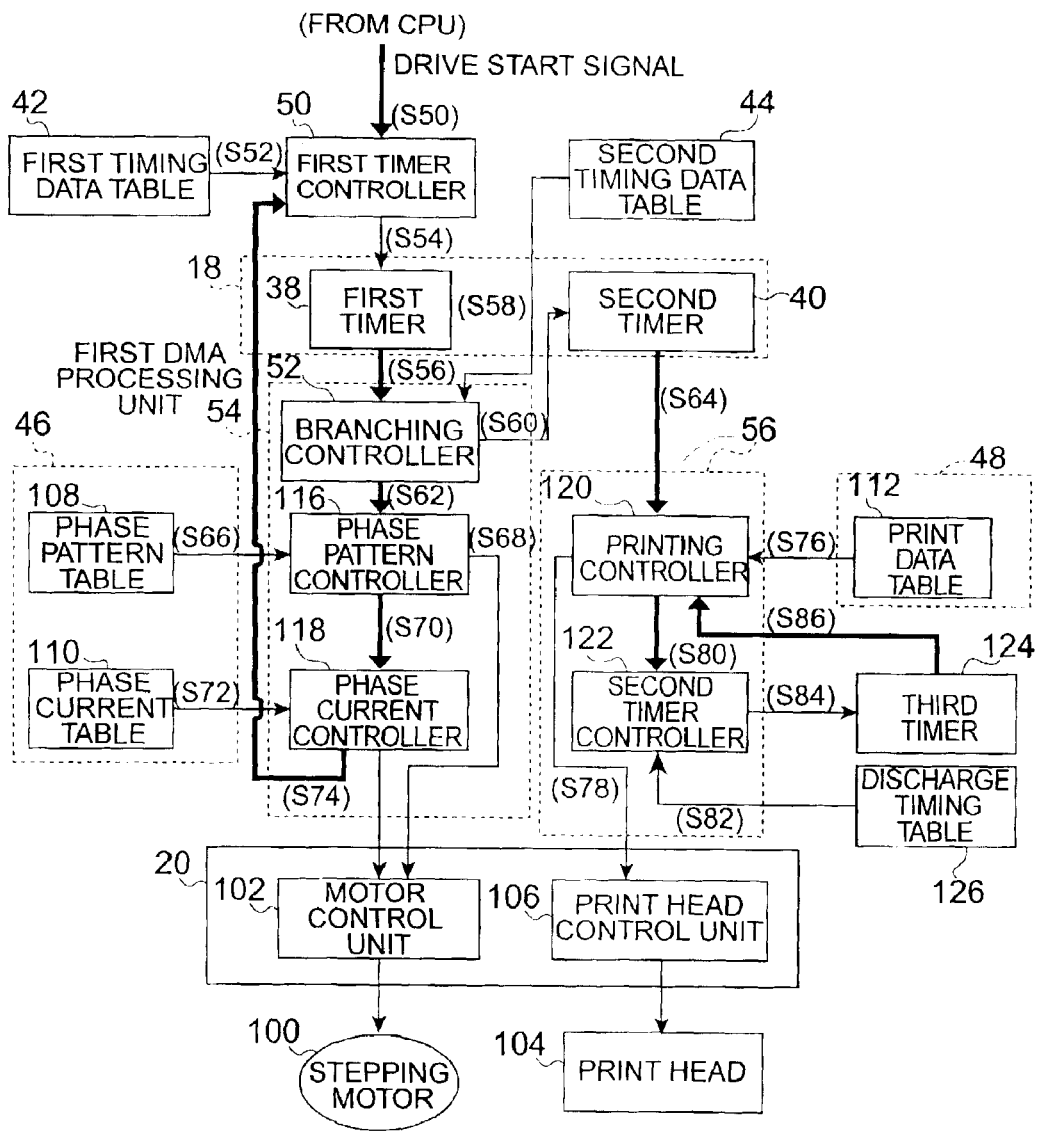
FIG. 4 is a functional block diagram showing the configuration and operating flow of a control apparatus according to a second embodiment of the invention.

A second embodiment of the present invention is described next with reference to FIG. 4 which is a functional block diagram showing the configuration of this second embodiment together with the flow of its operation.

This embodiment involves the application of the present invention to printer control. Accordingly, a motor control unit 102, corresponding to the first controller 34 of the first embodiment, controls a stepping motor 100 for driving a printer carriage, and a print head control unit 106, corresponding to the second controller 36 of the first embodiment, controls a print head 104. Furthermore, the first control data table 46 in this embodiment is composed of a phase pattern table 108 and a phase current table 110, and the second control data table 48 is composed of a print data table 112. Additionally, the first DMA processing unit 54 includes a phase pattern controller 116 and phase current controller 118 as DMA channels, while the second DMA processing unit 56 includes a printing controller 120 and a second timer controller 122 as DMA channels.

The phase pattern controller 116 transfers the phase pattern data stored in the phase pattern table 108 to the motor control unit 102, and the phase current controller 118 transfers the phase current data stored in the phase current table 110 to the motor control unit 102. The printing controller 120 transfers print data from the print data table 112 to the print head control unit 106. As further described below, print data for one pixel is transferred to the print head control unit 106 as data denoting whether ink is discharged in each segmented ink discharge period, and the print data transfer is synchronized to each ink discharge period by the second timer controller 122 and a third timer 124 that activates the printing controller 120 based on the discharge timing data stored in the discharge timing table 126.

In general the phase pattern of the voltage applied to the motor must be sequentially changed in order to drive a stepping motor. Therefore, control timing data indicating the timing for changing the phase of the stepping motor 100 is stored in the first timing data table 42, and the phase pattern data denoting the phase pattern of the voltage to be applied to the stepping motor 100 at the specified control timing is stored in the phase pattern table 108. It is also necessary to change the phase current supplied to the motor according to the drive control pattern when driving the stepping motor 100. The phase current data denoting the phase current at each control timing is stored in the phase current table 110.

Figure 5:
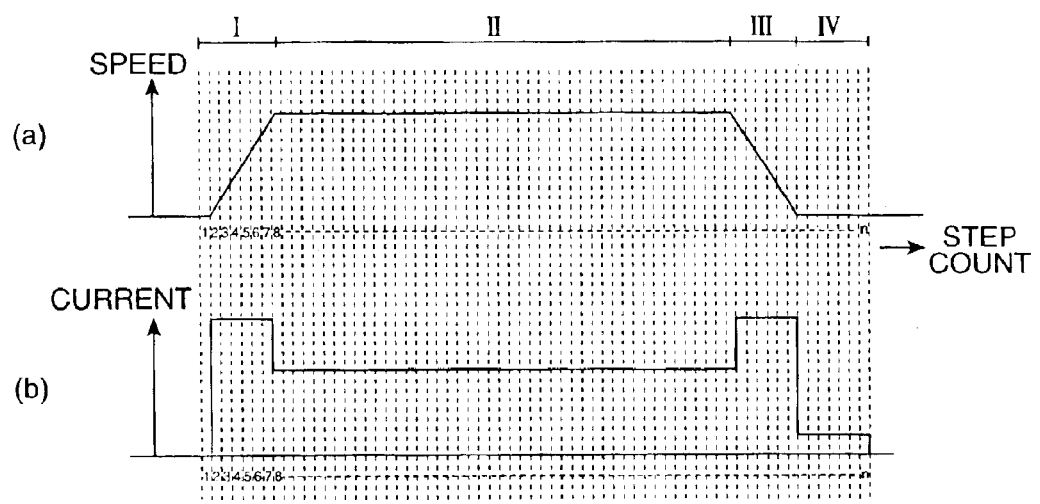
FIG. 5 shows a typical drive control pattern for a stepping motor, with (a) showing the stepping motor speed pattern and (b) showing the pattern of the current supplied to the stepping motor.

FIG. 5 shows a typical example of the stepping motor 100 drive control pattern, with graph (a) showing the stepping motor 100 speed pattern and graph (b) showing the pattern of the current supplied to the stepping motor 100. When the stepping motor 100 is driven using a speed pattern with a trapezoidal waveform as shown in FIG. 5(a), a relatively high phase current is supplied to accelerate the motor during acceleration period I, a comparatively low phase current is supplied in constant speed period II to overcome friction and maintain a constant speed, and a high phase current is then again supplied in deceleration period III to produce braking force and slow the motor. The CPU 12 sets the phase current data at each control timing in the phase current table 110 according to the phase current pattern determined according to the drive control pattern of the stepping motor 100.

It should be noted that a constant current continues to be supplied in period IV after the stepping motor 100 stops so that a slight current is supplied in all phases of the stepping motor 100 to rapidly attenuate residual stepping motor 100 vibrations. This technique of energizing the motor in all phases is referred to herein as supplying a steady current. Therefore, after the stepping motor 100 reaches the stop position, a steady current supply phase pattern (all phases) and steady current level are defined as the last control data, and the steady current supply time is set as the last control timing data.

As in the first embodiment, the first DMA processing unit 54 is activated at a timing determining by the control timing data stored in the first timing data table 42, and the control data stored in the phase pattern table 108 and phase current table 110 are sequentially supplied one at a time to the motor control unit 102. The stepping motor 100 is therefore controlled according to a drive pattern such as shown in FIG. 5(a) based on the data stored in these tables.

Figure 6:
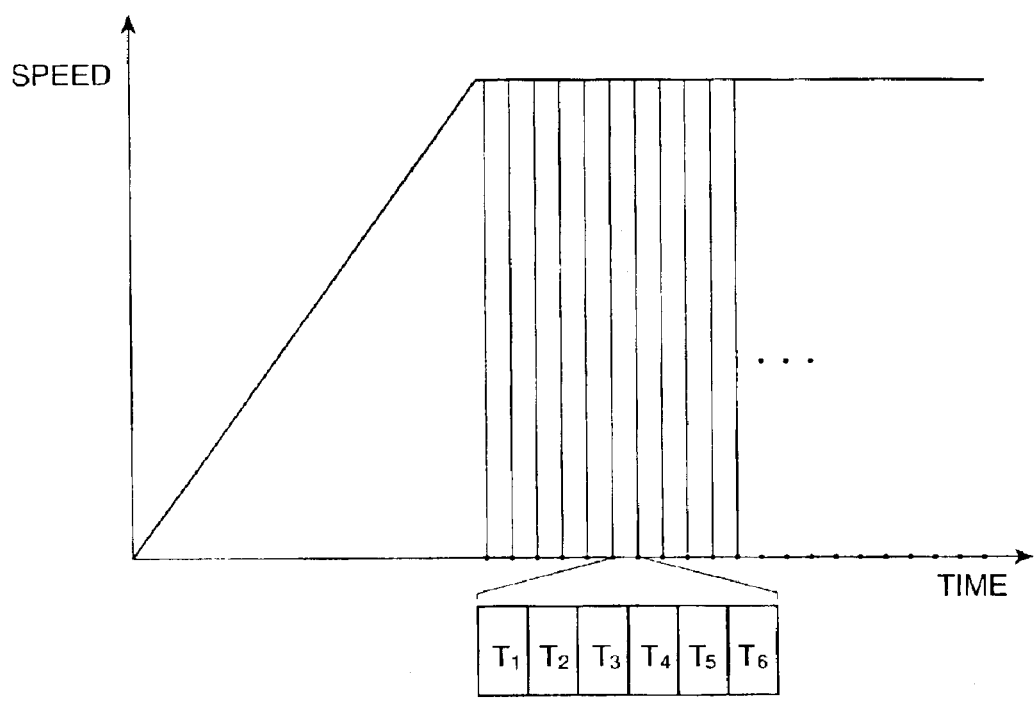
FIG. 6 shows the ink discharge periods for printing each pixel.

In the present embodiment, however, the phase of the stepping motor 100 changes each time the print head 104 prints one pixel. As shown in FIG. 6, the ink discharge period of the print head 104 for printing each pixel is segmented into multiple periods T1 to T6 for example, and the density of each pixel can be controlled by the printing controller 120 by transferring the print data denoting whether ink is to be discharged or not in each division T1 to T6 to the print head control unit 106 which is timed to each division T1 to T6. In other words, the print data stored in the print data table 112 specifies in which of the periods T1 to T6 the print head is to discharge ink in order to print each pixel, and this print data is transferred to the print head control unit 106 at the timing corresponding to each division T1 to T6.

It should be noted that ink discharge is not limited to the constant speed period; alternatively, ink can be discharged during acceleration and deceleration. Furthermore, the number of segments or periods into which each ink discharge period is divided shall not be limited to six; any desired number of divisions could be used.

Because the phase of the stepping motor 100 is changed each pixel, print data transfer in divisions T1 to T6 for each pixel must be synchronized to the phase change timing of the stepping motor 100. In this embodiment, the branching controller 52 starts the second timer 40 at the phase change timing, and activates the printing controller 120 at the time-up signal issued by the second timer 40. The second timer controller 122 is activated after the data transfer by the printing controller 120, and the discharge timing data stored in the discharge timing table 126 (that is, the data indicating the time length of divisions T1 to T6) is sent to the third timer 124. The printing controller 120 is then activated again at the time-up signal from the third timer 124. While synchronizing to the phase change timing of the motor, the printing controller 120 thus transfers print data for each pixel to the print head control unit 106 in each division T1 to T6.

The operation of the present embodiment is described next with reference to FIG. 4. First, when a print start signal is sent from the CPU 12 to the first timer controller 50 (S50), that controller reads timing data from the first timing data table 42 (S52) and transfers the read timing data to the first timer 38 (S54). Thereafter, when the time specified by the timing data elapses, the first timer 38 sends a time-up signal to the branching controller 52 (S56).

Upon activation by the time-up signal, the branching controller 52 reads timing data from the second timing data table 44 (S58), and transfers the read timing data to the second timer 40 (S60). When that data transfer is completed, the branching controller 52 activates the phase pattern controller 116, that is, the DMA destination (S62). When the time specified by timing data obtained from the second timing data table 44 elapses, the second timer 40 outputs a time-up signal to printing controller 120 (S64) to activate it.

The phase pattern controller 116, having been activated by the branching controller 52, reads phase pattern data from the phase pattern table 108 (S66) and transfers such data to the motor control unit 102 (S68). When this data transfer is completed, the phase pattern controller 116 activates the phase current controller 118, that is, the DMA destination (S70). The activated phase current controller 118 transfers phase current data from the phase current table 110 to the motor control unit 102 (S72, S74).

When the phase pattern data and phase current data are thus transferred to the motor control unit 102, the motor control unit 102 controls the stepping motor 100 according to this transferred data until the next control data is received in the next DMA transfer cycle.

Furthermore, the printing controller 120 activated by the second timer 40 transfers print data from the print data table 112 to the print head control unit 106 (S76, S78). When this data transfer is completed, the second timer controller 122, i.e., the DMA destination, is activated (S80), and discharge timing data is transferred from the third timer 124 to the discharge timing table 126 (S82, S84). When the third timer 124 outputs a time-up signal to the printing controller 120 (S86), the printing controller 120 is activated again and the next print data is transferred from the print data table 112 to the print head control unit 106.

Transferring the print data for one pixel is completed when the printing controller 120 completes this print data transfer process six times. Ink is thus discharged in select divisions/sub-periods of the ink discharge period as specified by the print data for each pixel, and each pixel is thus printed with the desired density.

This embodiment of the invention thus prints at the density specified for each pixel as a result of the phase pattern data and phase current data being transferred to the motor control unit 102 at the phase change timing specified by the timing data stored in the first timing data table 42. The printing controller 120 then transfers the print data for each division T1 to T6 to the print head control unit 106 in synchronization with each phase change timing.

Therefore, after the CPU 12 has stored timing data, phase pattern data, and phase current data to tables 42, 108, and 110 according to the drive control pattern of the stepping motor 100, and print data for each pixel (e.g., data denoting in which divisions T1 to T6 ink is to be discharged according to the pixel density) has been written to the print data table 112, this embodiment of the invention can execute the printing operation without going through the CPU 12. More particularly, this embodiment of the invention can precisely execute two independent, mutually synchronized processes, that is, controlling the driving of stepping motor 100 and controlling the printing of the print head 104, without imposing a load on the CPU 12.

It should be noted that in this second embodiment the timing data stored in the second timing data table 44 specifies the time delay from the phase change timing to when the printing controller 120 is activated. Therefore, if the printing position shifts in the carriage drive direction, the printing position can be adjusted (the so-called left/right offset adjustment) by setting the timing data appropriately.

This second embodiment has been described in connection with a monochrome printer employing a single print head, but it will be apparent to those skilled in the art that the present invention can be applied to a color printer having multiple print heads. That is, as described in the first embodiment, the number of control units for transferring control data by DMA can be increased as needed to three or more. In that case, a DMA processing unit is provided for each print head controller and each print head and can be controlled as described above.

Third Embodiment

A third embodiment of the present invention is described next. In this embodiment the first DMA processing unit 54 can dynamically change the operation of the DMA channels (that is, the content of the DMA control registers) in the second DMA processing unit 56 during control execution.

Figure 7:
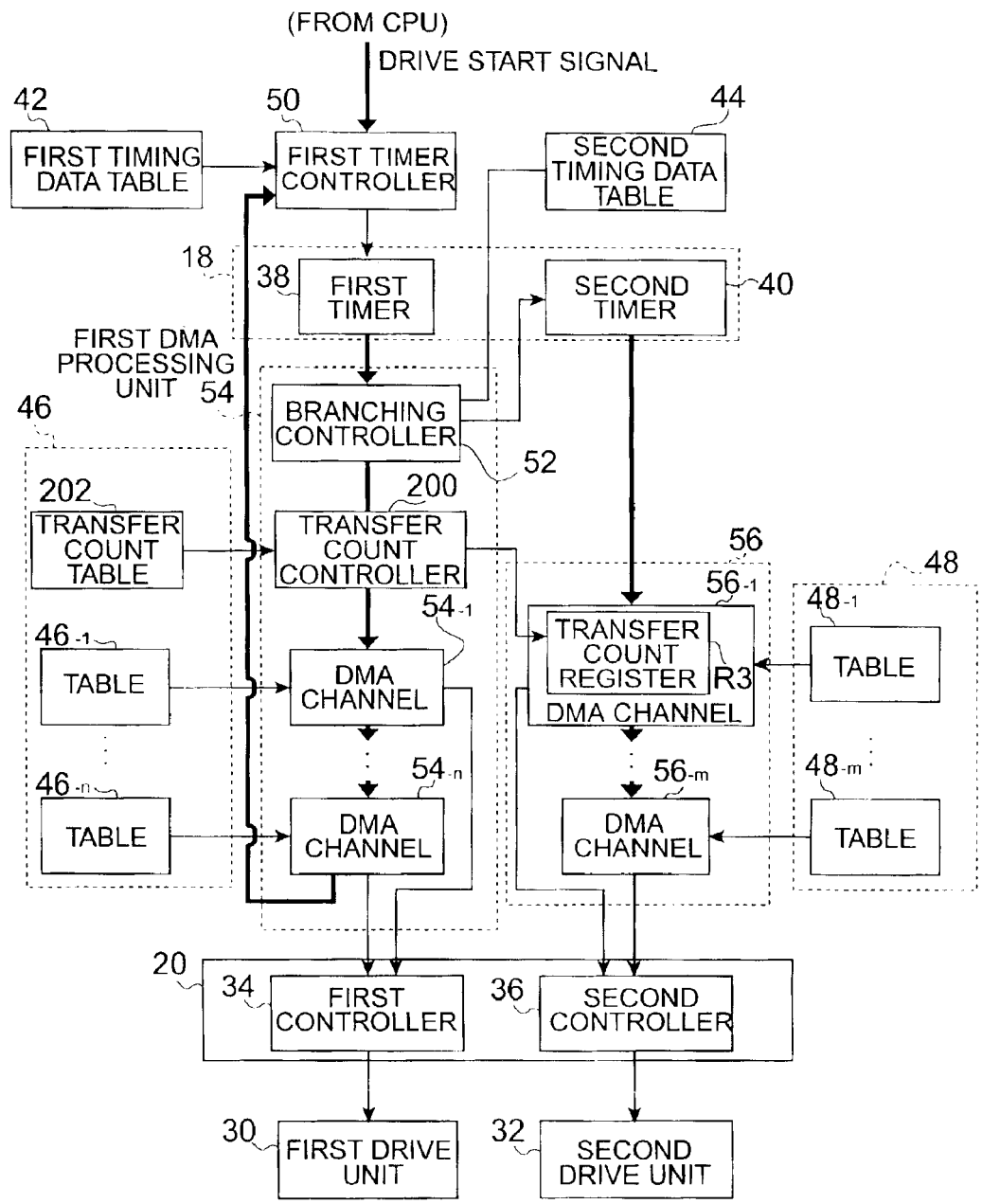
FIG. 7 is a functional block diagram showing the configuration and operating flow of a control apparatus according to a third embodiment of the invention.

FIG. 7 is a functional block diagram showing the configuration of this third embodiment together with the flow of its operation. As shown in the figure, the first DMA processing unit 54 has a transfer count controller 200 as a DMA channel, and the first control data table 46 accordingly has a transfer count data table 202. Transfer count data specifying the data transfer count of DMA channel $56_{-1}$ of the second DMA processing unit 56 is stored in the transfer count data table 202. When the transfer count controller 200 is activated, it transfers the transfer count data from the transfer count data table 202 to the transfer count register R3 in DMA channel $56_{-1}$. Thus, the number of bytes corresponding to the transfer count sent from the transfer count data table 202 are then held in count register R3.

The first DMA processing unit 54 in this embodiment of the invention can thus change the amount of data transferred by the DMA channel of the second DMA processing unit 56. This means that if this embodiment is applied to printer control, for example, the first DMA processing unit 54 runs a process for storing data received from a host computer in a receive buffer, and the second DMA processing unit 56 runs a process to output a specific number of pulses to the output port at a specified timing. The process run by the second DMA processing unit 56 can be changed dynamically from the first DMA processing unit 54 side so that, for example, the number of pulses output by the second DMA processing unit 56 changes according to the data received from the first DMA processing unit 54, or pulse output is even prohibited.

As will be apparent to those skilled in the art, this embodiment can be extended to dynamically change plural DMA channels in the second DMA processing unit. In such a case, plural transfer count controllers 200 can be provided to change the DMA operation of plural DMA channels in the second DMA processing unit 56.

Furthermore, the DMA operation that is changed is not limited to the transfer count. The transfer source address, transfer destination address, transfer method, and linked DMA channel can also be changed by appropriately writing data to the corresponding control registers. For example, the transfer count could be changed for DMA channel $56_{-1}$ while the transfer source address is changed for DMA channel $56_{-2}$.

This third embodiment describes the first DMA processing unit 54 changing the content of the DMA operation of the second DMA processing unit 56, but a configuration in which the second DMA processing unit 56 changes the content of the DMA operation of the first DMA processing unit 54 is also possible. Still further, if the second DMA processing unit 56 is configured to activate yet another DMA processing unit, then the second DMA processing unit 56 could further change the content of the DMA operation of that other DMA processing unit.

Fourth Embodiment

Figure 8:
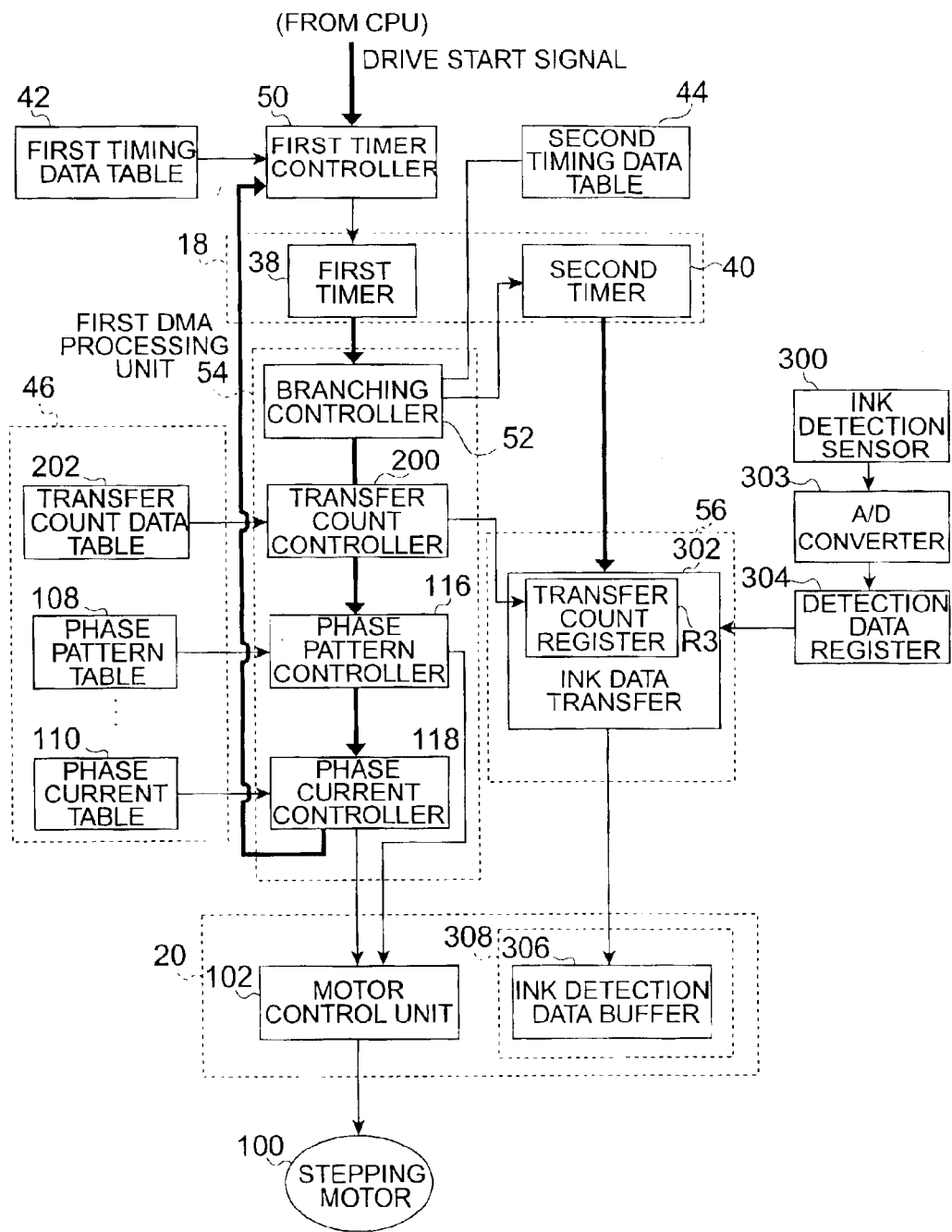
FIG. 8 is a functional block diagram showing the configuration and operating flow of a control apparatus according to a fourth embodiment of the invention.

A fourth embodiment of the present invention is described next. FIG. 8 is a functional block diagram showing the configuration of this fourth embodiment together with the flow of its operation.

This embodiment applies the present invention to controlling an ink-jet printer. Thus, the first DMA processing unit 54 controls a stepping motor 100 for driving a printer carriage as in the second embodiment (FIG. 4), and the second DMA processing unit 56 has an ink data transfer 302 for performing DMA transfers of ink detection data originating from an ink detection sensor 300.

The ink detection sensor 300 detects whether an ink tank is loaded in the printer and whether there is any ink in the ink tank. Its analog output signal is converted to a digital signal by an A/D converter 303, and stored in a detection data register 304 as the ink detection data.

The ink data transfer 302 of the second DMA processing unit 56 transfers the ink detection data stored in detection data register 304 to an ink detection data buffer 306 of an error processing controller 308 which runs an appropriate process based on the information (i.e., whether or not the ink tank is installed and/or whether or not there is any ink in the ink tank) embodied in the ink detection data stored in the ink detection data buffer 306.

Figure 9:
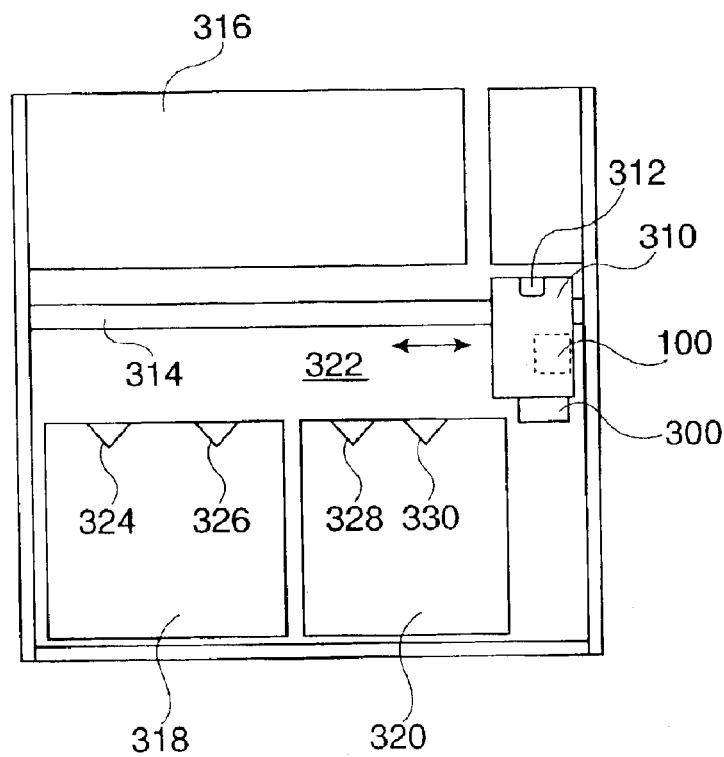
FIG. 9 is a schematic plan view showing the configuration of an ink-jet printer controlled in accordance with the fourth embodiment and the location of the ink detection sensor.

FIG. 9 is a schematic plan view showing the configuration of an ink-jet printer controlled by the present embodiment and the location of the ink detection sensor 300. As shown in this figure, the printer carriage 310 is guided by a guide shaft 314 and is driven along the guide shaft 314 by the stepping motor 100. The print head 312 disposed on the carriage 310 prints on a recording medium (e.g., paper) transported by a paper transportation unit 316.

Ink tanks 318 and 320 can be removably installed in the printer. One ink tank 318 is a color ink cartridge holding color ink, and the other ink tank 320 is a black ink cartridge holding black ink. When the ink tanks 318 and 320 are installed both color ink and black ink are supplied through ink tubes not shown in the figures to the print head 312.

Two detector prisms 324, 326 are disposed on the side of ink tank 318 facing the carriage movement space 322 and spaced apart in the carriage 310 movement direction. Two detector prisms 328, 330 are similarly positioned and spaced apart on the side of ink tank 320, both facing the carriage movement space 322.

The ink detection sensor 300 is mounted on the side of the carriage 310 facing the ink tanks 318 and 320, and thus passes in front of the detection prisms 324, 326, 328, 330 in this order or reverse order when the carriage 310 is driven left and right as seen in the figure. The ink detection sensor 300 has a light-emitter and a photodetector, and detects whether ink is in the ink tanks 318 and 320 and whether the ink tanks 318 and 320 are installed based on whether light is reflected from the detector prisms.

Of these detector prisms 324, 326, 328 and 330, prisms 324 and 328 detect ink in the ink tanks 318 and 320. When the amount of ink contained in the ink tanks 318 and 320 is greater than or equal to a specific level, these detection prisms 324 and 328 are immersed in the ink and do not reflect incident light from the ink detection sensor 300. When the ink level drops below this specific level, the prisms are exposed from the ink and thus reflect incident light. The ink detection sensor 300 can therefore detect whether ink is in the ink tanks 318 and 320 based on whether reflection from the detection prisms 324, 328 is detected.

Furthermore, detection prisms 326, 330 are disposed so that they are never immersed in the ink regardless of the ink level in the ink tanks 318 and 320, and thus always reflect incident light from the ink detection sensor 300. The ink detection sensor 300 can therefore detect whether ink tank 318 or 320 is installed based on whether reflection is detected from detection prism 326 or 330.

Figure 10:
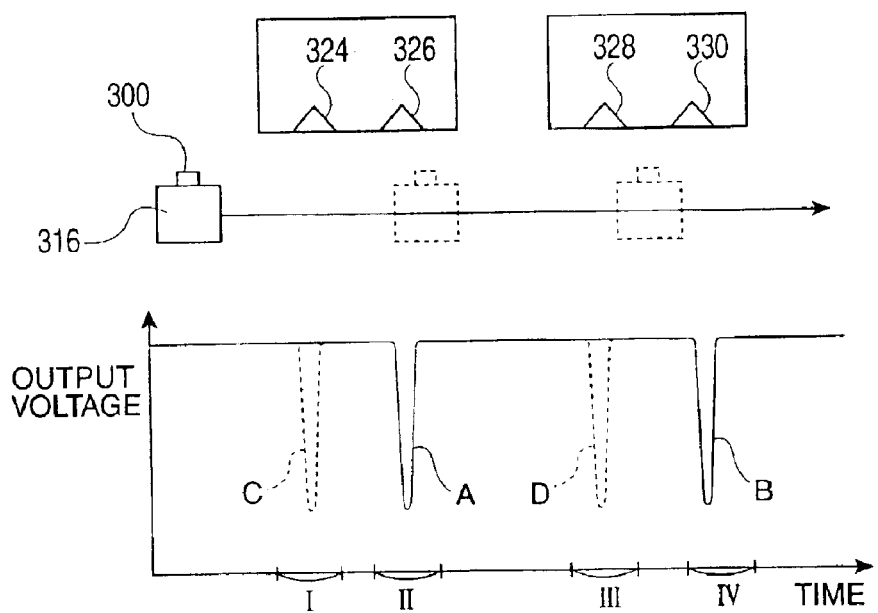
FIG. 10 shows an example of the voltage output signal of the ink detection sensor in conjunction with the relative positions of the carriage and detection prisms.

FIG. 10 shows an example of the voltage output signal from the ink detection sensor 300 and the correlation between the relative positions of the carriage 310 and detector prisms 324 to 330. It should be noted that in this example the output voltage drops when the photodetector of the ink detection sensor 300 detects light. When both ink tanks 318 and 320 are installed and there is ink in both ink tanks, signals corresponding to detector prisms 324, 328 are not detected as indicated by the solid line in the figure, and signals A and B corresponding to detection prisms 326, 330 are output. When the ink in the ink tanks 318 and 320 drops below a specified level such that detector prisms 324, 328 are exposed, signals C and D corresponding to detector prisms 324, 328 are also output as indicated by the dotted lines in the figure.

As will be understood from the signal waveforms shown in FIG. 10, signals corresponding to detector prisms 324 to 330 are output only for a very small part of the entire period. To minimize the memory capacity required in the ink detection data buffer 306, it is therefore preferable to store only the signals for the periods before and after output of the signals corresponding to detector prisms 324 to 330 (i.e., the signals from periods I to IV in FIG. 10) to the ink detection data buffer 306 as the ink detection data. On the other hand, because periods I to IV are determined by the movement of the carriage 310, the timing for data transfers to the ink detection data buffer 306 must be set based on the position of carriage 310 movement in order to capture only the signals from periods I to IV.

As shown in FIG. 8 and described above, this third embodiment of the invention employs a transfer count controller 200 in the first DMA processing unit 54 which controls the stepping motor 100 that drives the carriage 310. Transfer of ink detection data is controlled by the ink data transfer 302 in cooperation with the transfer count controller 200 which transfers data from the transfer count data table 202 to the transfer count register R3 of the ink data transfer 302.

Figure 11:
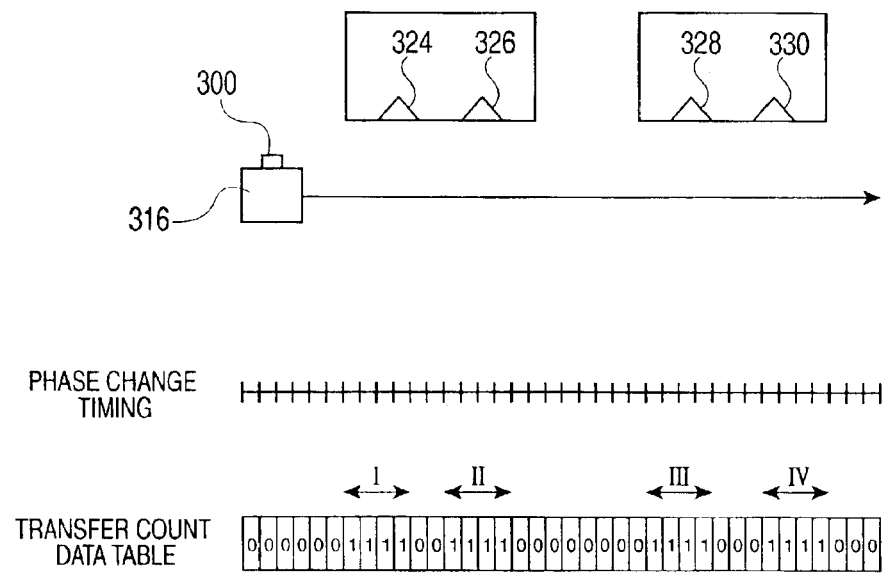
FIG. 11 shows the content of the transfer count data table according to the fourth embodiment correlated to the carriage position and stepping motor phase change timing.

FIG. 11 shows the data in the transfer count data table 202 of this embodiment correlated to the position of the ink detection sensor 300 and the phase change timing of the stepping motor 100. As shown in the figure, transfer control data denoting whether or not transferring the ink detection data is required (1=required; 0=not required) is stored in the transfer count data table 202 correlated to the phase change timing of the stepping motor 100. Note that the values in the ranges corresponding to periods I to IV are 1.

As in the second embodiment, the first DMA processing unit 54 is activated at the phase change timing. The transfer control data stored in the transfer count data table 202 is therefore also transferred to the transfer count register R3 of ink data transfer 302 at the phase change timing. If the value of the transfer control data sent to the transfer count register R3 is 1, the data transfer count is also 1, and the ink data transfer 302 transfers one byte of ink detection data from the detection data register 304 to the ink detection data buffer 306. However, if the value of the transfer control data written in the transfer count register R3 is 0, the data transfer count is 0 and no data is transferred by the ink data transfer 302.

It should be noted that the output data from one sensor is one byte long above, but if the sensor output data is two bytes long the data transfer count passed when data transfer is required is "2."

By controlling the number of bytes transferred by the ink data transfer 302 of the second DMA processing unit 56 (or more specifically whether or not data is transferred) according to the position of the carriage 310 controlled by the first DMA processing unit 54, the present embodiment can thus transfer sensor output data to the ink detection data buffer 306 only in the required periods I to IV. This embodiment of the invention can therefore greatly reduce the required memory capacity of the ink detection data buffer 306 while enabling the error processing controller 308 to efficiently determine if the ink supply is depleted based on the ink detection data.

Fifth Embodiment

Figure 12:
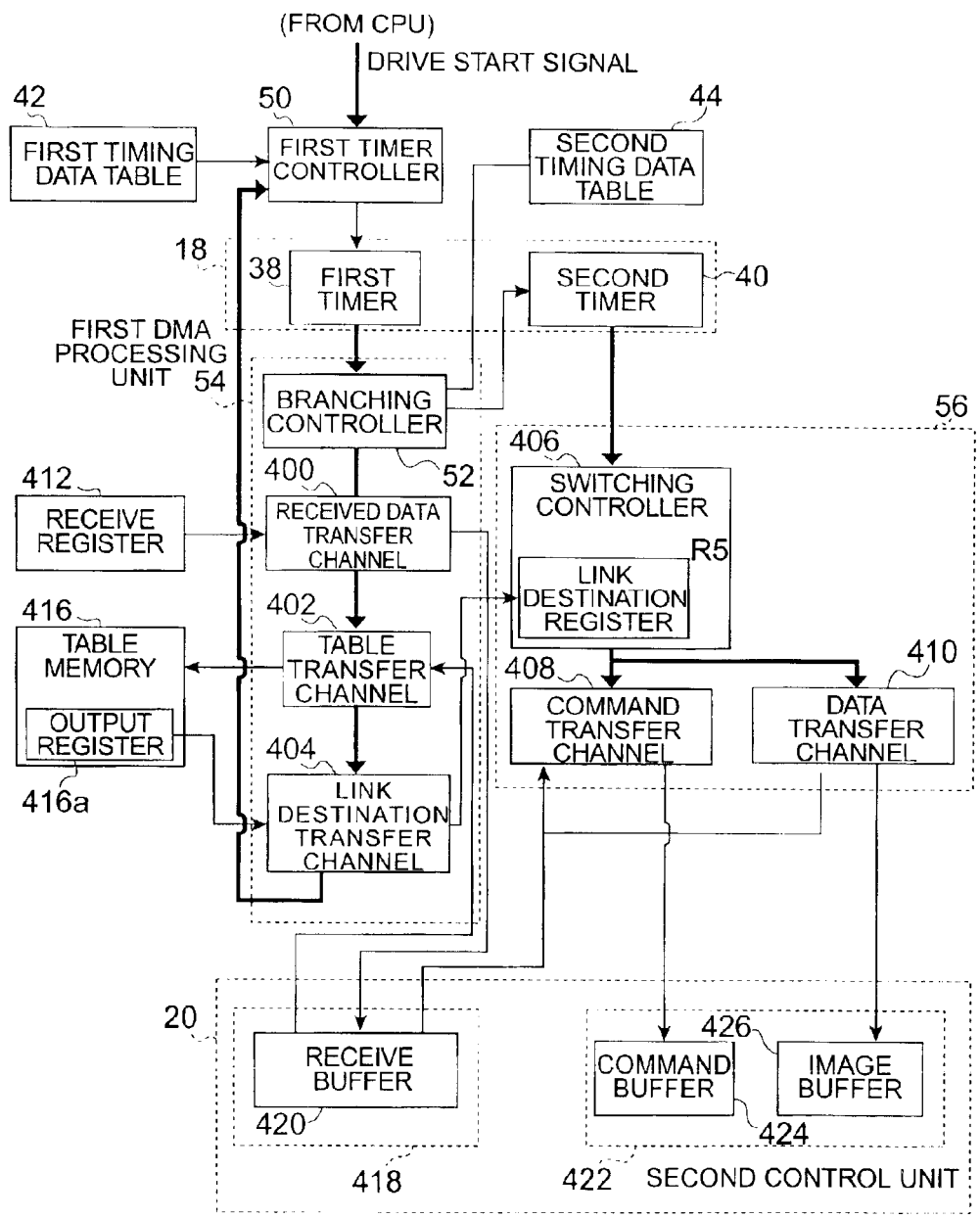
FIG. 12 is a functional block diagram showing the configuration and operating flow of a control apparatus in accordance with a fifth embodiment of the invention.

A fifth embodiment of the present invention is described next. FIG. 12 is a functional block diagram showing the configuration of this fifth embodiment together with the flow of its operation.

In this embodiment the first DMA processing unit 54 stores data received by the printer from a host computer in a receive buffer 420 of the first control unit 418. From that received and stored data, the second DMA processing unit 56 retrieves and respectively stores the control commands and print data in a command buffer 424 and an image buffer 426 of the second control unit 422. The second control unit 422 runs a specific control process based on the data stored in the command buffer 424 and image buffer 426, and the first control unit 418 runs a specific control process based on the remaining received data stored in the receive buffer 420.

Figures 13, 14:
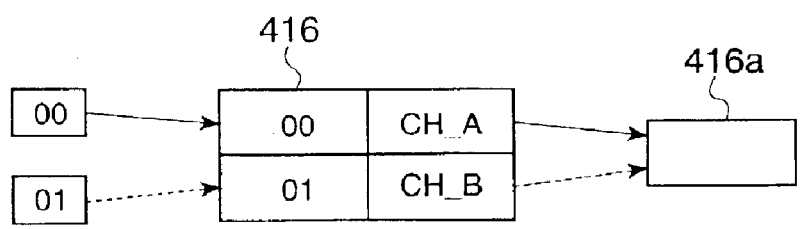
FIG. 13 shows a typical data sequence sent from a host computer to a printer in the fifth embodiment of the invention.
FIG. 14 describes the configuration and operation of the table memory according to the fifth embodiment of the invention.

FIG. 13 shows an example of data sent from a host computer to a printer in accordance with this embodiment of the invention. In the data train shown in this figure the value 00 indicates that the immediately following byte is a control command, and the value 01 indicates that the following byte is print data. In this example, therefore, x1, x2, and x3 following the 00 values are interpreted as control commands, and d1, d2, and so forth following 01 values are interpreted as print data. The control commands following a received 00 are transferred to the command buffer 424, and print data following a received 01 is transferred to the image buffer 426.

To achieve this operation, the first DMA processing unit 54 has a received data transfer DMA channel 400, a table transfer DMA channel 402, and a link destination transfer DMA channel 404. The second DMA processing unit 56 has as DMA channels a switching controller 406, a command transfer DMA channel 408, and a data transfer DMA channel 410. Either the command transfer channel 408 or data transfer channel 410 is set as the linked DMA channel of the switching controller 406. Data received by the printer from the host computer is stored in the receive register 412.

When the received data transfer DMA channel 400 of the first DMA processing unit 54 is activated by branching controller 52, the received data is transferred from the receive register 412 to the receive buffer 420. The table transfer DMA channel 402 then transfers the received data stored in the receive buffer 420 to the table memory 416.

The table memory 416 outputs values determined by the data written thereto to a specific output register 416a. As shown in FIG. 14, the table memory 416 outputs DMA channel number CH_A for the command transfer DMA channel 408 in the second DMA processing unit 56 when a 00 value denoting a control command is received, and when a 01 value denoting print data is received it outputs DMA channel number CH_B for the data transfer DMA channel 410 of the second DMA processing unit 56.

The link destination transfer DMA channel 404 then passes the data written to the output register 416a to the link destination register R5 of the switching controller 406 in the second DMA processing unit 56. The link destination of the switching controller 406 in the second DMA processing unit 56 is therefore set to either the command transfer DMA channel 408 or the data transfer DMA channel 410 according to the value (00 or 01) of the received data.

The command transfer channel 408 transfers data from the receive buffer 420 to the command buffer 424, and the data transfer channel 410 transfers data from the receive buffer 420 to the image buffer 426. This means that only control commands in the received data are stored in the command buffer 424, and only print data in the received data are stored in the image buffer 426.

Data transfers from the receive buffer 420 in the present embodiment are thus executed by the table transfer channel 402, command transfer channel 408, and data transfer channel 410, but when one byte of data is transferred from the receive buffer 420 by any one of these transfer channel, the transfer source address is incremented in all three transfer channels. As a result, when 00 or 01 data indicating the data type is transferred from the receive buffer by the table transfer channel 402, the command transfer channel 408 or data transfer channel 410 transfers the control command or print data following the 00 or 01, respectively, and the table transfer channel 402 then transfers the next 00 or 01 data. Because the table transfer channel 402 thus always sends a 00 or 01 denoting the data type from the receive buffer 420 to the table memory 416, values other than 00 or 01 will not be transferred to the table memory 416.

Next, the data transfer process sending data from the receive buffer 420 to the command buffer 424 or image buffer 426 in the present embodiment is described more specifically with reference to a case in which the data train shown in FIG. 13 is stored in receive buffer 420. Note that the transfer source address of the table transfer channel 402 is set to the first address in the receive buffer 420.

The table transfer channel 402 first transfers the first value, 00, of the received data to the table memory 416. This causes the table memory 416 to output CH_A corresponding to 00 to the output register 416a. The link destination transfer channel 404 then transfers the address CH_A written to the output register 416a to the link destination register R5 of the switching controller 406 in second DMA processing unit 56. The linked DMA channel of the switching controller 406 is thus set to the command transfer channel 408. That is, when the command transfer channel 408 is activated after the switching controller 406, the second received data unit, that is, the control command x1, is transferred to the command buffer 424.

The fourth and sixth data units, i.e., control commands x2 and x3, corresponding to the 00 value of the third and fifth data units are likewise transferred to the command buffer 424.

The address CH_B is similarly output from the table memory 416 due to the 01 value of the seventh and ninth data units and written to the link destination register R5 of the switching controller 406, thus activating the data transfer 410. The print data values d1 and d2 in the eighth and tenth blocks are therefore transferred by the data transfer 410 to the image buffer 426.

Depending upon whether the data received by the first DMA processing unit 54 is a control command or print data, this embodiment of the invention thus changes the data transfer destination of the second DMA processing unit 56 to the command buffer 424 or the image buffer 426.

This embodiment has been described using two types of received data, control commands and print data, by way of example, but it will be apparent that there could three or more types of received data. In such a case, DMA channels corresponding to each of the handled data types are disposed in the second DMA processing unit 56 and the linked DMA channel of the switching controller 406 is set according to the received data type to transfer data to buffers for each type of data.

Effects of the Invention

As described above, by employing a second DMA processing unit that can be activated from a first DMA processing unit, the present invention advantageously enables the independent transfer of control data to first and second control units while synchronizing the data transfers. The present invention therefore enables more complex control operations using direct memory access.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A control apparatus for sending control data appropriate for a specific one of a plurality of controllers each running a process based on at least one type of control data, the control apparatus comprising:

a first DMA processing unit configured to be activated each time a first activation signal is received, read from memory control data of a type compatible with a first controller, and transfer that read control data to the first controller; and a second DMA processing unit configured to be activated each time a second activation signal is received, read from memory control data of a type compatible with a second controller, and transfer that read control data to the second controller;

wherein the first DMA processing unit comprises a DMA activation component configured to execute a process of sending the second activation signal to the second DMA processing unit.

2. A control apparatus as described in claim 1, further comprising:

first and second control data tables from which control data is read by the first and second DMA processing units; and a control data setting component configured to write control data to the first and second control data tables.

3. A control apparatus as described in claim 1, further comprising:

a first timer configured to output a first time-up signal when a time specified by timing data received by the first timer elapses; and a first timer controller configured to be activated each time a drive signal or reactivation signal is received, read from memory timing data specifying a change-operation timing for the first controller, and send the read timing data to the first timer;

wherein the first time-up signal output by the first timer is applied to the first DMA processing unit as the first activation signal; and wherein the first DMA processing unit reactivates the first timer controller when the first DMA processing unit completes a transfer of data to the first controller.

4. A control apparatus as described in claim 3, further comprising:

a timing data table from which the first timer controller reads timing data; and a timing data setting component configured to set timing data in the timing data table.

5. A control apparatus according to claim 3, further comprising:

a second timer configured to output a second time-up signal when a time specified by timing data received by the second timer elapses;

wherein the DMA activation component is configured to read timing data from memory and send the read timing data to the second timer each time the first activation signal is received; and wherein the second time-up signal output by the second timer is sent as the second activation signal to the second DMA processing unit.

6. A control apparatus as described in claim 3, wherein:

the first controller is configured to control a stepping motor that drives a printer carriage of an ink-jet printer having an ink data output configured to output an ink detection signal indicative of ink presence;

the second controller comprises a processing unit configured to execute a specific process based on ink detection data obtained from the ink detection signal;

the timing data sent to the first timer by the first timer controller specifies the phase change timing of the stepping motor;

the control data transferred by the first DMA processing unit to the first controller contains phase pattern data for specifying the phase pattern of voltage to be applied to the stepping motor at each phase change timing, and current data for specifying the current to be supplied to the stepping motor at each phase change timing;

the second DMA processing unit comprises an ink-data-transfer DMA configured to read from memory and transfer to the second controller ink detection data obtained from the ink detection signal; and the DMA-operation-controller of the first DMA processing unit is configured to read from memory transfer count data as the operational control data, and transfer that read transfer count data to a control register of the ink-data-transfer DMA, the transfer count data having a value of 0 or a specified positive value.

7. A control apparatus as described in claim 3, wherein:

the first controller is configured to control a stepping motor that drives a printer carriage of a printer;

the second controller is configured to control a print head disposed on the printer carriage;

the timing data sent to the first timer by the first timer controller specifies the phase change timing of the stepping motor;

the control data transferred to the first controller by the first DMA processing unit includes phase pattern data for specifying the phase pattern of voltage to be applied to the stepping motor at each phase change timing, and current data for specifying the current to be supplied to the stepping motor at each phase change timing; and the control data transferred to the second controller by the second DMA processing unit includes print data to be printed by the print head at the phase change timing.

8. A control apparatus as described in claim 7, wherein:

the print data specifies each pixel to be printed by the print head, the ink being discharged in each of a multiple sub-periods of the ink discharge period of the print head; and the second DMA processing unit comprises a DMA configured to be activated each time the second activation signal is received, reads print data from memory, and transfers the read print data to the second controller, and an activation component configured to send the second activation signal to the DMA of the second DMA processing unit at a timing corresponding to each of the multiple sub-periods.

9. A control apparatus according to claim 1, wherein the first DMA processing unit comprises a DMA for each type of control data to be used and compatible with the first controller, each DMA of the first DMA processing unit being configured to read from memory and transfer to the first controller the corresponding type of compatible control data one data unit at a time.

10. A control apparatus according to claim 9, wherein the first DMA processing unit comprises a plurality of DMAs that are sequentially activated.

11. A control apparatus as described in claim 9, wherein:

the second DMA processing unit comprises a DMA for each type of control data to be used and compatible with the second controller, each DMA of the second DMA processing unit being configured to read from memory and transfer to the second controller the corresponding type of compatible control data one data unit at a time; and the first DMA processing unit comprises a DMA-operation-controller configured to read from memory and transfer to a control register of at least one DMA of the second DMA processing unit operation control data specifying the data transfer operation of the at least one DMA of the second DMA processing unit.

12. A control apparatus as described in claim 11, wherein the operation control data specifies at least one of a data transfer source, a data transfer destination, a data transfer count, or a linked DMA channel indicating a DMA of the second DMA processing unit to be activated next.

13. A control apparatus as described in claim 12, wherein:

the second DMA processing unit comprises a first DMA and a plurality of second DMAs that can be activated by the first DMA; and the DMA-operation-controller of the first DMA processing unit is configured to transfer to a control register of the first DMA of the second DMA processing unit operation control data specifying as the linked DMA channel any one of the plurality of second DMAs.

14. A control apparatus as described in claim 13, wherein:

the first controller includes a receive buffer configured to store data received by a printer;

the second controller includes a plurality of type-specific buffers, each configured to store received data of the specified data type;

the plurality of second DMAs of the second DMA processing unit are disposed according to their respective types, and transfer data stored in the receive buffer to the type-specific buffers according to the data type; and the first DMA processing unit comprises:

a received-data-transfer DMA configured to read from memory and transfer to the receive buffer data received by the printer, a table transfer DMA configured to read from the receive buffer and transfer to memory DMA identification data indicating which second DMA corresponds to a particular received data type when data denoting the received data type is received by the table transfer DMA, and a DMA configured to read the DMA identification data output from memory and transfer it to a control register of the first DMA as operation control data specifying the linked DMA channel.

15. A control method for sending control data appropriate for a specific one of a plurality of controllers each running a process based on at least one type of control data, the method comprising:

activating a first DMA processing routine each time a first activation signal is asserted, the first DMA processing routine including reading from memory control data of a type compatible with a first controller, and transferring that read control data to the first controller; and activating a second DMA processing routine each time a second activation signal is asserted, the second DMA processing routine including reading from memory control data of a type compatible with a second controller, and transferring that read control data to the second controller;

wherein the first DMA processing routine comprises a DMA activation step for executing a process of sending the second activation signal to the second DMA processing unit.

16. A control method as described in claim 15, wherein each time the first activation signal is asserted the DMA activation step includes reading timing data from memory and asserting the second activation signal when a time specified by that read timing data elapses.

17. A control method as described in claim 15, further comprising:

reading from, memory timing data specifying a change-operation timing for the first controller; and asserting the first activation signal when a time specified by the timing data elapses, each time a drive signal or reactivation signal is issued.

18. A control method as described in claim 17, wherein each time the first activation signal is asserted the DMA activation step includes reads timing data from memory and asserting the second activation signal when a time specified by that read timing data elapses.

19. A control method for sending to each of multiple control units control data appropriate for the respective control unit, each control unit being adapted to run a process based on at least one type of control data, the control method comprising the steps of:

(a) detecting first activation signals;

(b) upon each detected first activation signal, reading control data of a type suitable for a first control unit from memory and transferring the control data to the first control unit;

(c) detecting second activation signals; and (d) upon each detected second activation signal, reading control data of a type suitable for a second control unit from memory and transferring the control data to the second control unit;

wherein step (b) includes a step of issuing the second activation signal.

20. The method of claim 19, wherein step (b) comprises, upon each first activation signal, reading timing data from memory and issuing the second activation signal when a time specified by the timing data passes.

21. The method of claim 19, further comprising the steps of:

(e) detecting timing activation signals; and (f) upon each detected timing activation signal, reading from memory timing data specifying a change-operation timing for the first control unit, and issuing the first activation signal when a time specified by the timing data passes.

22. The method of claim 21, wherein step (b) comprises, upon each first activation signal, reading timing data from memory and issuing the second activation signal when a time specified by the timing data passes.

* * * * *